Dec. 11, 1928.　　　　　R. WITTLINGER　　　　1,694,999

KNIFE

Filed Dec. 16, 1925

Inventor,
Richard Wittlinger
By
William L. Symons
His atty.

Patented Dec. 11, 1928.

1,694,999

UNITED STATES PATENT OFFICE.

RICHARD WITTLINGER, OF GOPPINGEN, GERMANY.

KNIFE.

Application filed December 16, 1925, Serial No. 75,741, and in Germany October 10, 1924.

My invention relates to a method of making knives with handles, and to the knives made by said method.

It is an object of my invention to provide a knife, for instance, a table knife, which is not subject to the formation of crevices or other irregularities at the handle which give access to dirt and moisture.

In table knives of the usual type, the several parts of the knife are manufactured in separate operations and connected in finished condition. The blade is generally of steel and the handle may be made of various metals, those most frequently used being silver or German silver. The handle is made from two symmetrical forged halves which are joined by brazing or in any other way, and when finished the handle constitutes a hollow body in which the blade is held by soldering or cementing. A filler, sand, sawdust, etc. may be inserted in the space between the handle and the end of the blade.

Cleaning with hot water often damages such knives due to the connection between the handle and the blade becoming loose. This is not only troublesome when the knife is handled but also bad from a sanitary point of view as dirt will accumulate in the crevices which form on the blade becoming loose and such dirt cannot be removed.

It has already been proposed to make the blade and its handle integral, for instance, by forging the blade and the handle from a single piece of steel or other suitable material. This, however, detracts from the appearance as a steel handle is unsightly. On the other hand, it has been proposed to make the blade of a knife from copper or nickel or other rustless material, and fruit knives or the like have been made on this principle. While such knives are of good appearance, their cutting qualities are obviously poor.

The drawbacks of these old types of knives are overcome in my invention by making the blade and one part of the handle from an alloy, for instance, a copper alloy of known composition, which is forgeable at high temperature and has good cutting qualities, but is not subject to corrosion.

As the blade and one half of the handle are integral, crevices cannot form. The other half is made separately and connected with the first half by brazing or welding.

In the drawings, a knife made in accordance with my invention is illustrated by way of example, it being understood that I am not limited to the particular type shown and described.

Figure 1:
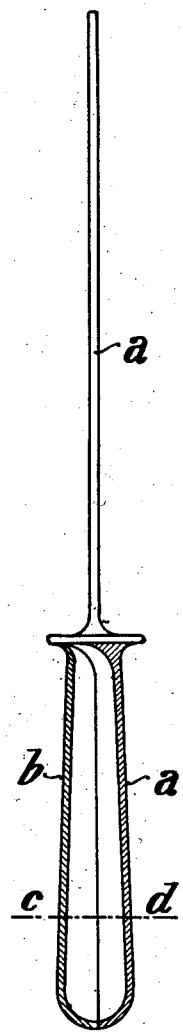
Fig. 1 is an elevation of a finished knife, the handle being shown in section.
Figure 2:
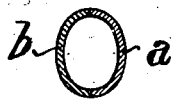
Fig. 2 is a section on the line c—d of Fig. 1.
Figure 3:
Fig. 3 is a longitudinal section of the handle part which is made separately.
Figure 4:
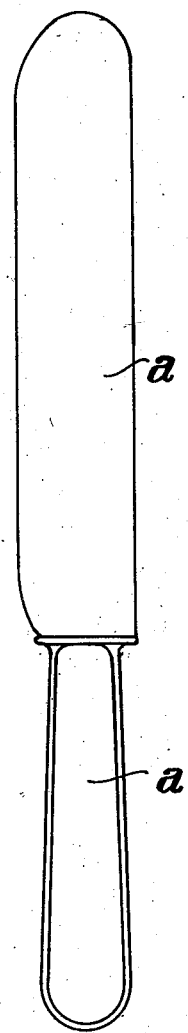
Fig. 4 is a plan view of the finished knife.

The blade $a$ and the one half $a'$ of the handle are forged integrally from a suitable alloy, for instance malleable German silver, the part $a'$ being hollow. The other half, $b$, is forged similarly and preferably from the same material, and joined with the integral half $a'$ by brazing or welding, as described.

A suitable alloy consists of 47 parts of copper, 37.5 parts of zinc, 10 to 12 parts of nickel, two parts of manganese, one part of iron, and .5 part of aluminum. A blade made from this alloy is equal to a steel blade, it may be ground similarly and is not attacked by acids.

I claim:

An article of manufacture having a cutting edge and made from an alloy of 47 parts copper, 37.5 parts of zinc, 10 to 12 parts of nickel, two parts of manganese, one part of iron, and .5 part of aluminum.

In testimony whereof, I have signed my name to this specification at Stuttgart this 1st day of December, 1925.

RICHARD WITTLINGER.